(12) United States Patent
Strickling et al.

(10) Patent No.: US 12,480,974 B2
(45) Date of Patent: Nov. 25, 2025

(54) MULTIPLEXER-ENABLED CABLES AND TEST FIXTURES

(71) Applicant: Tektronix, Inc., Beaverton, OR (US)

(72) Inventors: Sam J. Strickling, Portland, OR (US); Daniel S. Froelich, Portland, OR (US); Michelle L. Baldwin, Mount Juliet, TN (US); Jonathan San, Palo Alto, CA (US); Lin-Yung Chen, New Taipei (TW); Shane A. Hazzard, North Plains, OR (US)

(73) Assignee: Tektronix, Inc., Beaverton, OR (US)

( * ) Notice: Subject to any disclaimer, the term of this patent is extended or adjusted under 35 U.S.C. 154(b) by 778 days.

(21) Appl. No.: 17/375,451

(22) Filed: Jul. 14, 2021

(65) Prior Publication Data
US 2022/0034967 A1    Feb. 3, 2022

Related U.S. Application Data

(60) Provisional application No. 63/060,010, filed on Aug. 1, 2020.

(51) Int. Cl.
| | | |
|---|---|---|
| *G01R 31/00* | (2006.01) | |
| *G01R 1/04* | (2006.01) | |
| *G01R 1/073* | (2006.01) | |
| *H01R 13/66* | (2006.01) | |

(Continued)

(52) U.S. Cl.
CPC ....... *G01R 1/07385* (2013.01); *G01R 1/0408* (2013.01); *G01R 1/0416* (2013.01); *H01R 13/66* (2013.01); *G01R 31/318572* (2013.01); *G01R 31/3191* (2013.01); *G01R 31/31926* (2013.01)

(58) Field of Classification Search
CPC .......... G01R 1/0408; G01R 1/0416; G01R 1/07385; G01R 31/31723; G01R 31/3191; G01R 31/31926; G01R 31/318572; G01R 31/31905; G01R 31/2829; H01R 13/66
See application file for complete search history.

(56) References Cited

U.S. PATENT DOCUMENTS

| | | | |
|---|---|---|---|
| 5,418,470 A | 5/1995 | Dagostino | |
| 5,625,299 A * | 4/1997 | Uhling | G01R 31/2844 |
| | | | 324/754.07 |
| 6,532,557 B1 | 3/2003 | Wong | |

(Continued)

FOREIGN PATENT DOCUMENTS

| | | |
|---|---|---|
| CN | 106199091 | 12/2016 |
| CN | 107359491 | 11/2017 |
| GB | 2226644 A | 7/1990 |

*Primary Examiner* — Thang X Le
(74) *Attorney, Agent, or Firm* — Miller Nash LLP; Andrew J. Harrington (57) ABSTRACT

A calibrated test and measurement cable for connecting one or more devices under test and a test and measurement instrument, including a first port structured to electrically connect to a first signal lane, a second port structured to electrically connect to a second signal lane, a third port structured to electrically connect to a test and measurement instrument, and a multiplexer configured to switch between electrically connecting the first port to the third port and connected the second port to the third port. The first and second signal lanes can be included on the same device under test or different devices under test. An input can receive instructions to operate the multiplexer.

21 Claims, 5 Drawing Sheets

(51) Int. Cl.
*G01R 31/3185* (2006.01)
*G01R 31/319* (2006.01)

(56) References Cited

U.S. PATENT DOCUMENTS

| | | | |
|---|---|---|---|
| 6,703,825 B1 | 3/2004 | Creek | |
| 7,783,799 B1 | 8/2010 | Sivertsen | |
| 9,863,988 B1 | 1/2018 | Seguine | |
| 2002/0113591 A1 | 8/2002 | Hinks | |
| 2004/0059437 A1 | 3/2004 | Cullen | |
| 2005/0185768 A1 | 8/2005 | Pickerd et al. | |
| 2006/0252419 A1 | 11/2006 | Liu | |
| 2007/0276614 A1* | 11/2007 | Tan | G01R 35/00 702/55 |
| 2010/0220874 A1 | 9/2010 | Sakai | |
| 2011/0196211 A1* | 8/2011 | Al-Ali | A61B 7/04 600/300 |
| 2014/0103907 A1 | 4/2014 | Muecke | |
| 2014/0181601 A1 | 6/2014 | Olgaard et al. | |
| 2015/0184991 A1 | 7/2015 | Nakabayashi | |
| 2015/0285892 A1* | 10/2015 | Muecke | G01R 31/3191 324/130 |
| 2015/0304864 A1* | 10/2015 | Olgaard | H04B 17/00 370/251 |
| 2017/0108533 A1* | 4/2017 | Ohmart | G01R 31/31905 |
| 2017/0146632 A1* | 5/2017 | Wadell | G01R 1/07342 |
| 2018/0024164 A1 | 1/2018 | Fan et al. | |
| 2019/0113561 A1* | 4/2019 | Yogeeswaran | H04B 10/071 |
| 2020/0103485 A1* | 4/2020 | Anderson | H04B 17/21 |
| 2020/0284822 A1* | 9/2020 | Whittington | G01R 1/06788 |
| 2022/0034967 A1 | 2/2022 | Strickling | |
| 2022/0390513 A1 | 12/2022 | Hazzard et al. | |

\* cited by examiner

Fig. 5

MULTIPLEXER-ENABLED CABLES AND TEST FIXTURES

PRIORITY

This disclosure claims benefit of U.S. Provisional Application No. 63/060,010, titled "MUX-ENABLED CABLES AND TEST FIXTURES," filed on Aug. 1, 2020, which is incorporated herein by reference in its entirety.

TECHNICAL FIELD

This disclosure is directed to systems and methods related to test and measurement systems, and in particular, to test and measurement systems for measuring multiple signals from a device under test (DUT).

BACKGROUND

Many DUTs includes a multitude of similarly designed signal paths. For example, a Peripheral Component Interconnect (PCI) Express (PCIe or PCI-e) plug-in card and/or a PCIe motherboard slot commonly include up to sixteen electrical signal "lanes." The electrical signal lanes are typically differential signal lane, meaning that two electrical ports comprise one differential signal. However, test and measurement instruments typically used to test such DUTs, such as oscilloscopes or bit error rate testers (BERTs), typically have one, two, or four input ports. Some oscilloscopes include eight input channels or ports. High performance instruments, however, typically have fewer input channels due to the increased hardware costs. Physical channel density limitations also can keep channel count low for thermal, through put reasons. For this reason, it is typical that a test and measurement instrument configuration will be connected to a subset of the electrical signal lanes to be tested.

To test each or all signal lane(s), a user must manually move a connection between the test and measurement instrument and the DUT, e.g., a test cable or probe, from each lane to lane manually. Manually moving the cable or probe is an error-prone and very time and labor-intensive process. Alternatively, such as in a two-channel test and measurement environment, a radio frequency (RF) switch can be built and maintained to allow for automation for testing all signal lanes of the DUT. However, identifying a suitable switch and correctly de-embedding the impact of the switch from the signal path are difficult at higher frequencies. Because of this, many users do not trust the switches can be de-embedded without significant errors, especially above 25 GHz.

Examples of the disclosure address these and other deficiencies of the prior art.

BRIEF DESCRIPTION OF THE DRAWINGS

Aspects, features and advantages of examples of the present disclosure will become apparent from the following description of examples in reference to the appended drawings in which.

DESCRIPTION

Figure 1:
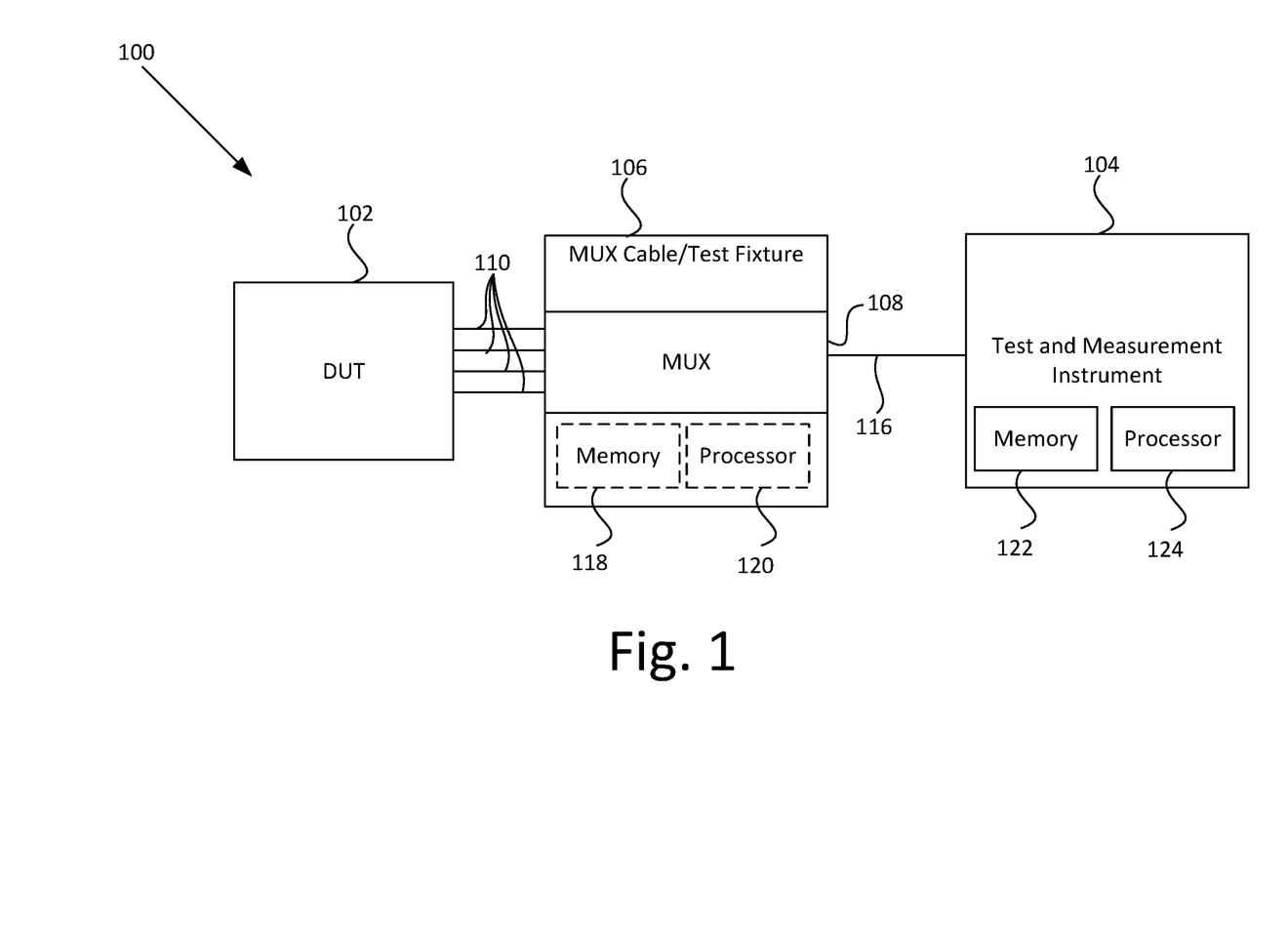
FIG. 1 is a block diagram of a multiplexer cable or test fixture in a test and measurement system according to some examples of the disclosure.

FIG. 1 illustrates an example block diagram of a test and measurement system 100 according to some examples of the disclosure. The test and measurement system 100 includes a device under test (DUT) 102 connected to a test and measurement instrument 104 through a cable or test fixture 106 with a multiplexer 108, which may also be referred to as a data selector.

The DUT 102 can include multiple signal lanes 110. The cable or test fixture 106 can attach to the signal lanes 110 of the DUT 102. In some examples, the cable or test fixture 106 can attach to different signal lanes of different DUTs 102. The cable or test fixture 106 includes a number of DUT connections 110. Although four DUT connections 110 into the multiplexer 108 are shown, any number of connection can be included, such as, but not limited to, eight, sixteen, or thirty-two connections. For example, the connections 110 may include high-density connections. High density connections include any connections that are eight or greater.

As will be understood by one skilled in the art, a DUT 102 may refer to a stand-alone device under test with one or more signal lanes, or may refer to a particular signal lane of a DUT 102 that has multiple signal lanes.

The multiplexer 108 of the cable 106 can then connect 116 one or more of the signal lanes 110 to the test and measurement instrument 104. Although FIG. 1 shows a single connection 116 to the test and measurement instrument 104, any number of connections 116 can be included, such as the same number of inputs. Depending on the DUT 102 and the test and measurement instrument 104, signals may travel both to and from each of the DUT 102 and the test and measurement instrument 104.

In some examples, the cable or test fixture 106 may include a memory 118 and/or a processor 120. The cable or test fixtures 106 can be tested during manufacturing or at the factory to determine all the de-embed and/or calibration parameters for the cable or test fixture 106 to remove the impacts of the cable or test fixture 106 from the signal results. For each of discussed, the term calibration parameters will be used to refer to any calibration parameters, including de-embed parameters of the cable or test fixture 106, that are used to remove effects or impacts of the cable from any signal measurements made by the test and measurement instrument 104. The calibration parameters may be stored in the memory 118 and sent to the test and measurement instrument 104. In some examples, the calibration parameters may be sent to an analysis device that is remote from a test and measurement instrument 104. The analysis device may collect the calibration parameters as well as data from the test and measurement instrument 104 and provide any processing needed of the data, as will be understood by one skilled in the art. In other examples, the calibration parameters for a particular cable or test fixture 106 may be stored in a memory 122 located in the test and measurement instrument 104 or retrieved from remote storage, such as cloud storage. The calibration parameters may be identified based on a serial number or other identification number of the cable or test fixture 106.

As mentioned above, in some examples, the cable or test fixture 106 may include a processor 120. The processor 120 can operate the multiplexer 108 to connect various lanes of the DUT 102 to the test and measurement instrument 104. In other examples, a processor 124 of the test and measurement instrument 104 can send control signals to the multiplexer 108 to connect various lanes of the DUT 102 to the test and measurement instrument 104. The test and measurement instrument 104 can also send power signals to the cable and test fixture 106. The power and control signals may be sent through a separate connection (not shown) between the cable or test fixture 106 and the test and measurement instrument 104, or the test and measurement instrument 104 may be able to send the signals through the connection with the one or more connections 116.

The processor 120 of the test and measurement instrument 104 can also de-embed effects of the cable or test fixture 106 using the calibration parameters specific to the cable or test fixture 106.

Figure 2:
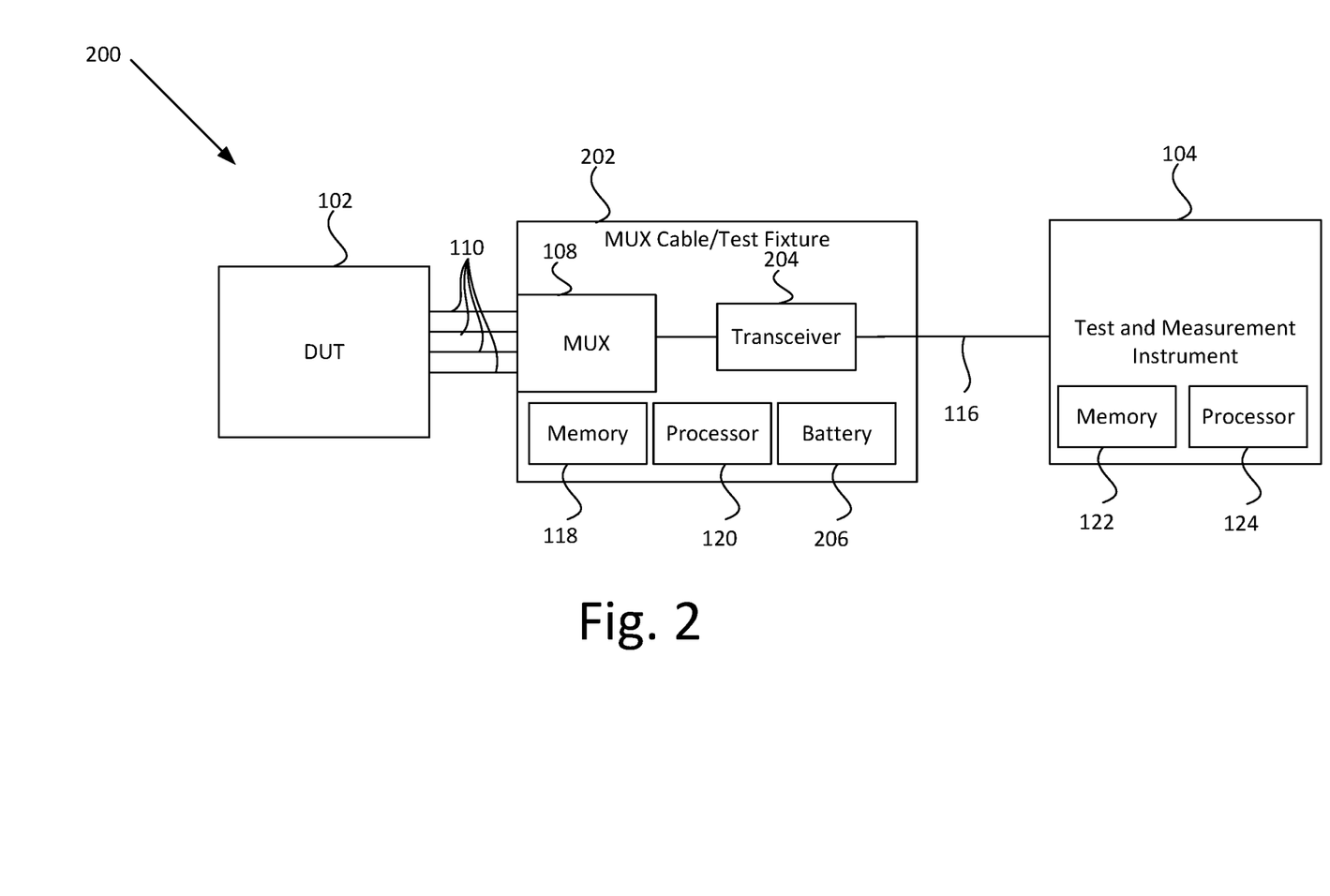
FIG. 2 is a block diagram of another multiplexer cable or test fixture in a test and measurement system according to other examples of the disclosure.

FIG. 2 illustrates an alternative test and measurement system 200 according to some examples of the disclosure. In this example, many features of the test and measurement system 200 are similar to those discussed above with respect to FIG. 1. Accordingly, these features have the same reference numbers and are not discussed further herein with respect to FIG. 2.

In some examples, the multiplexer cable or test fixture 202 may include a transceiver 204 and/or a battery 206. Both a transceiver 204 and a battery 206 are not required. In some examples, only a battery 206 is provided in the cable or test fixture 202. The battery 206 can provide power for the multiplexer 208, memory 118, and the processor 120.

The battery 206 may be rechargeable in some examples and may receive or siphon power from either the DUT 106 or the test and measurement instrument 104 through a connection (not shown). The transceiver 204 may be a wireless transceiver and may wirelessly send the signals through the connection 116 to the test and measurement instrument 104 in some examples. The processor 120 may receive instructions through the transceiver 204 for operating the multiplexer 108.

Figure 3:
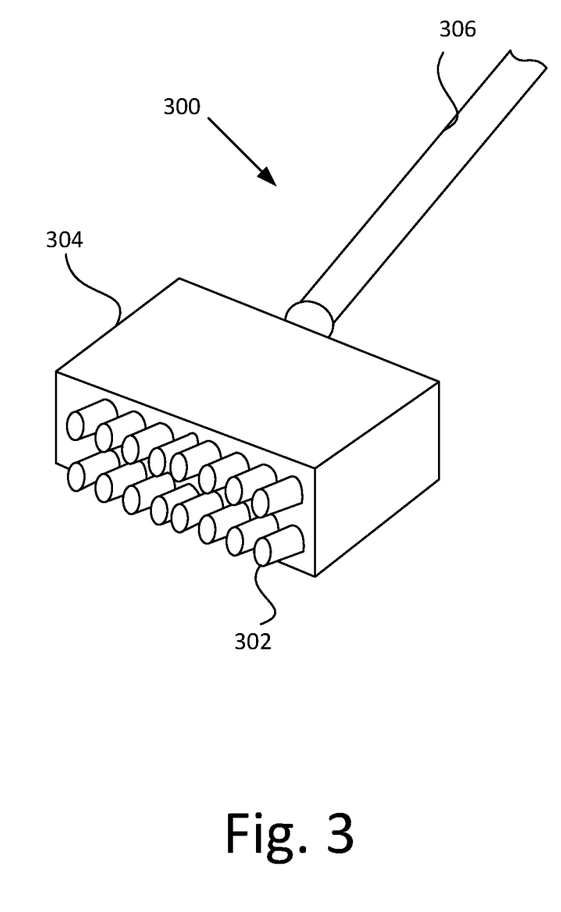
FIG. 3 is an illustration of a multiplexer cable according to some examples of the disclosure.

FIG. 3 illustrates an example cable or test fixture 300 according to some examples of the disclosure. Cable 300 includes a number of connectors 302 that can connect to a DUT, such as DUT 102. In FIG. 3, sixteen connectors 302 are shown. Examples of the cable or test fixture 300 are not limited to sixteen connectors 302 and any number of connectors 302 may be used. The cable 300 can include a housing 304 that houses the multiplexer 108 and any of the other components illustrated in the cable or test fixture 106 in FIG. 1 or the cable or test fixture 202 in FIG. 2. In the example illustrated in FIG. 3, a single connection or output 306 is shown in the cable 300 that can connect, for example, to a test and measurement instrument 104. However, more than one connection 306 may be provided as discussed above.

Figure 4:
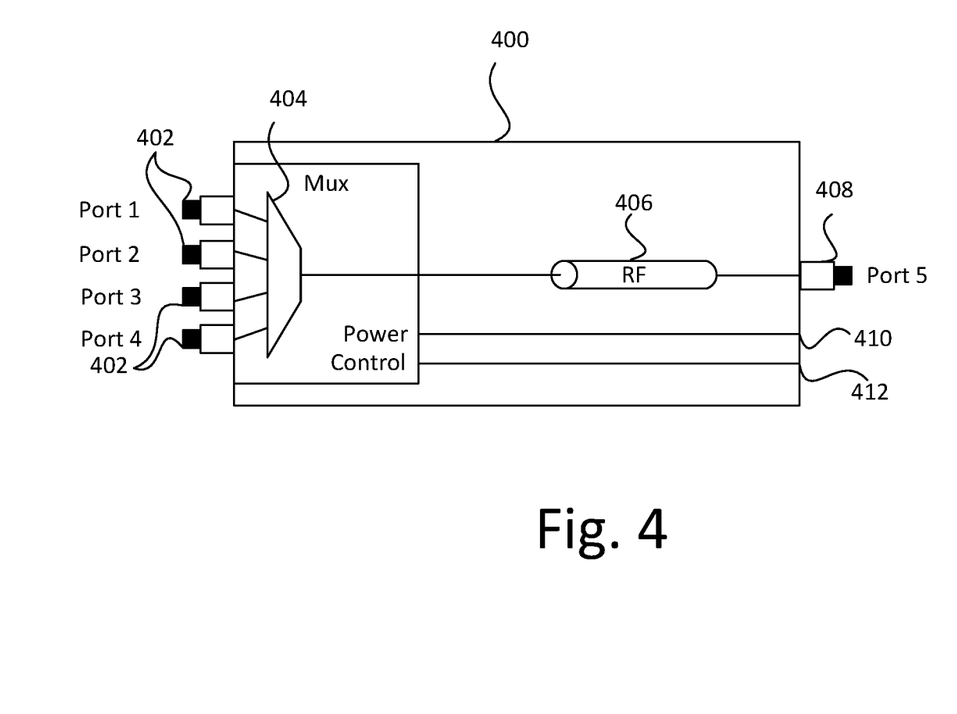
FIG. 4 is a block diagram of an example multiplexer cable or test fixture according to some examples of the disclosure.

FIG. 4 illustrates a block diagram of a radio frequency (RF) cable 400 according to some examples of the disclosure. For ease of illustration, the cable 400 is shown having four ports 402 which connect to a four input multiplexer 404. A signal on the RF transmission line 406 can be transmitted to a port 408, which can be connected to a test and measurement instrument. Additionally or alternative, a signal from the test and measurement can be sent through the connection 408 and output to one of the ports 402 connected to one or more DUTs. That is, the ports 402 may connect to a particular signal lane of one or more DUTs or may each connect to a different DUT.

As shown in FIG. 4, power 410 and control 412 signals may be received from a connected test and measurement instrument. While power 410 and control 412 signals are shown as separate inputs to the cable 400, in some examples, the signals may be sent over a single connector or may be sent over the RF transmission line 406.

The scattering parameters, also referred to as S-parameters, for each of the ports may be stored to assist the test and measurement instrument 104 in de-embedding the cable 400 from the signal of the DUT 102. For example, when port 1 is enabled, the through path S-parameters $S_{11}$, $S_{51}$, $S_{15}$, and $S_{55}$ and the isolation path S-parameters $S_{52}$, $S_{53}$, and $S_{54}$ that were determined during manufacturing of the cable 400 can be stored, either directly in a cable memory itself, as shown in FIGS. 1 and 2, are stored within the test and measurement instrument 104. The through path and isolation path S-parameters are stored for each of the ports 402 and the port 408. In some examples, a user may upload or otherwise port their own S-parameters, such as if the user wishes to change the S-parameters or add stress to the system.

Examples of the disclosure are not limited to the example shown in FIG. 4. As will be understood by one of ordinary skill in the art, multiplexers 404 with more connections may be used, as well as multiple multiplexers 404 may be used. For examples, the cable 400 could have eight ports 402, four each going to a multiplexer 404. Then, either two connections 408 may be provided in the cable 400, or a third multiplexer could be provided to receive the outputs from the four input multiplexer 404 and output a single output to the test and measurement instrument. That is, a tree of multiplexers may be provided in a single multiplexer unit 404 that can be used to route the signals as desired between one or more DUTs and one or more test and measurement instruments.

Figure 5:
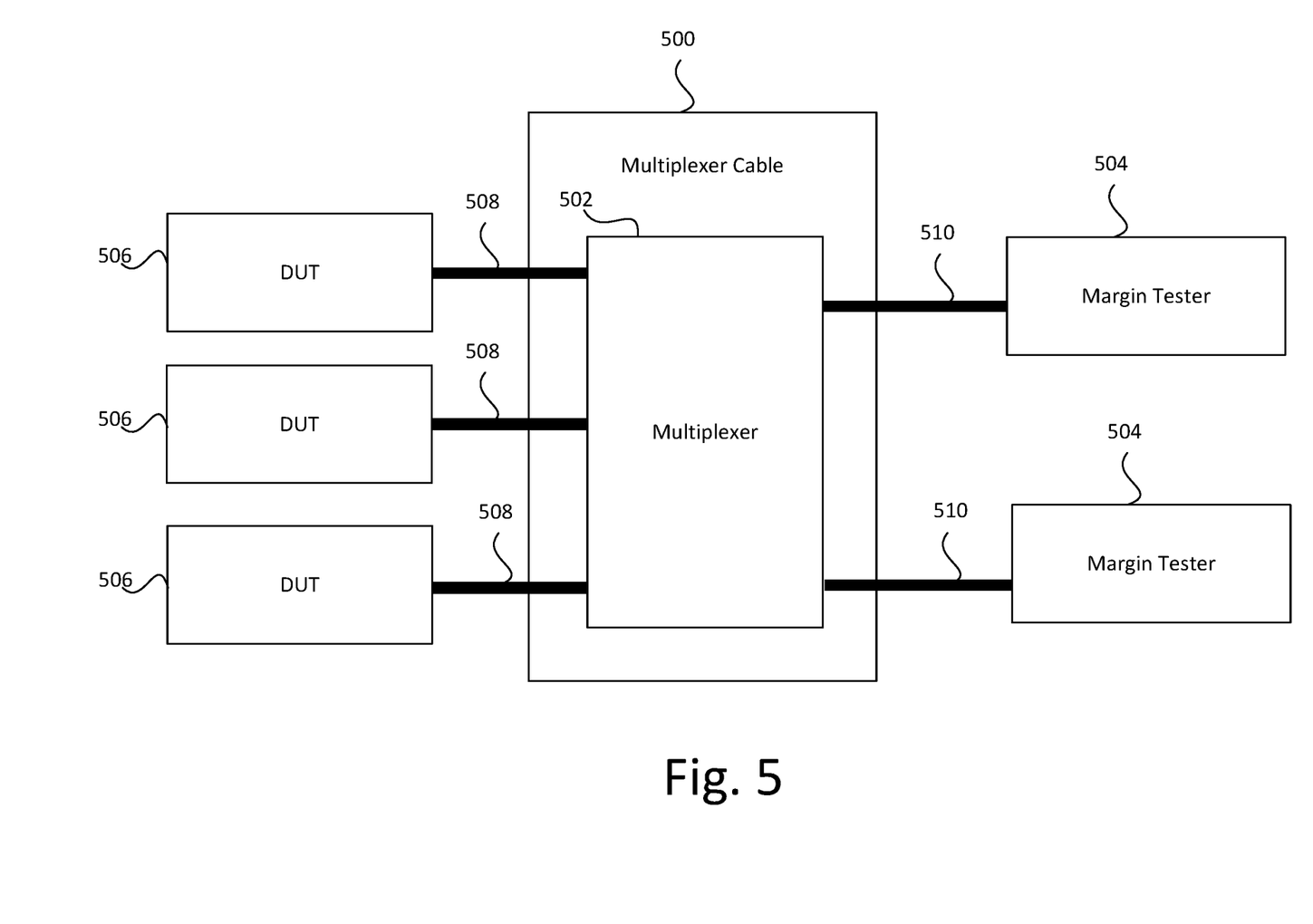
FIG. 5 is a block diagram of an example multiplexer cable or test fixture in a test and measurement system according to other examples of the disclosure.

FIG. 5 illustrates another example system with a cable 500 including one or more multiplexers 502. While one multiplexer 502 is shown in FIG. 5, the multiplexer 502 may be comprised of a number of different multiplexer 502. In such an example, the test and measurement instrument 504 may be, for example, highly-integrated Margin Tester devices that may be used, for example, to quickly and easily test a multi-lane DUT 506. U.S. patent application Ser. No. 16/778,249, and U.S. patent application Ser. No. 16/778,262, both filed Jan. 31, 2020, the contents of which are each hereby incorporated by reference in their entirety, describe such highly-integrated Margin Testers. As described in the above-referenced document, Margin Testers are able to simultaneously test multiple signals lanes of a DUT 506 by a high-density connection. Margin Testers can also test the signal lanes of the DUT 506 sequentially, rather than simultaneously.

One or more DUTs 506 may connect to the multiplexer cable 500 through high-density connections 508. That is, each connection 508 represents a high-density connection, such as, but not limited to, eight, sixteen, or thirty-two connections. However, for ease of illustration and explanation, the high-density connection 508 is shown as a single connection.

The multiplexer 502 can connect to one or more of the DUTs 506 through the high-density connections 508 and can output a high-density connection 510 to one or more test and measurement instrument 504. The multiplexer 502 can connect one of the DUTs 506 to the test and measurement instrument 504 through the connections 508 and 510. In some examples, signals are transmitted simultaneously across each high-density connection 508 from and to the DUT 506 connected to the test and measurement instrument 504 through the high-density connection 510. That is, all signal lanes of one of the DUTs 506 can be tested sequentially or simultaneously by the test and measurement instrument 504 through the connection by the multiplexer 502.

This can allow for multiple DUTs 506 to be tested on the same box at near the same time for comparison and/or manufacturing purposes. Further, the test and measurement instrument 504 can test each lane of the high-density connections 508 separately, as discussed in the patent applications mentioned above and incorporated by reference. In such a situation, a DUT 506 having a large number of signal lanes, such as, but not limited to, ninety-six signal lanes, can be connected from the DUT 506 through four high-density and the multiplexer 502 can connect one lane at a time to the test and measurement instrument 504.

While FIG. 5 illustrates multiple DUTs 506 connected to two test and measurement instrument 504, examples of the disclosure are not limited to this configuration. An equal number of DUTs 506 and test and measurement instruments 504 may be provided, or a single test and measurement instrument 504 may connect to multiple DUTs 506. Having multiple test and measurement instruments 504 connected to one DUT 506 may facilitate testing multiple protocols on the DUT 506 at or near the same time.

In some examples, the multiplexer 502 may have an equal number of inputs and outputs. This can allow a DUT 506 to connect to the test and measurement instrument 504 through high-density connections 508 and 510 through the multiplexer 502. This can allow non-standard protocols like compute express link (CXL), custom protocols, or link-state permutations to be tested on a DUT 506. The multiplexer 502 can connect and disconnect various signal lanes of the DUT 506 and the signal lanes of the test and measurement instrument 504. Additionally or alternatively, the multiplexer 502 can include adaptors that allow for changing and/or splicing signal types. For example, an adaptor may be connected to the multiplexer 502 to allow a user to use a raw COAX connection for a PCIe connection to allow for a less messy connection. The multiplexer 502 would then be able to store within a memory the adaptor's S-parameters that are known and embedded. That is, the adaptor may modify the connection type of the multiplexer 502.

The multiplexer cable 500 may include additional components, such as a memory, processor, or battery, similar to other examples discussed above with respect to FIGS. 1 and 2 and not further described herein. Additionally or alternatively, source and control signals may be received from one or more the connected test and measurement instruments 504. The test and measurement instrument 504 may send the control and source signals through the high-density connection 510 or may be sent through a separate connection.

Similar to examples discussed above, the calibration parameters of the cable 500 can be determined at the time of manufacture and used by the test and measurement instrument 504 to remove the effects of the cable 500 from any measurements of the one or more DUTs 506.

Examples of the disclosure allow for one or more test and measurement instruments to test one or more signal lanes which may come from one or more DUTs. The multiplexer cables or test fixtures of the disclosure can allow for switching between the various signal lanes to one or more test and measurement instruments. The multiplexer cables have known calibration parameters determined at manufacturing or the factory that can be used by the test and measurement instruments to remove any effects of the cable. This can save hours of manual labor from individually connecting each signal lane or output of a DUT to a test and measurement instrument.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Examples

Illustrative examples of the technologies disclosed herein are provided below. A configuration of the technologies may include any one or more, and any combination of, the examples described below.

Example 1 is a cable for connecting one or more devices under test to a test and measurement instrument, comprising a first port structured to electrically connect to a first signal lane; a second port structured to electrically connect to a second signal lane; a third port structured to electrically connect to a test and measurement instrument; and a multiplexer configured to switch between electrically connecting the first port to the third port, or connecting the second port to the third port.

Example 2 is the cable of example 1, further comprising a memory structured to store calibration parameters of the test and measurement cable.

Example 3 is the cable of either one of examples 1 or 2, wherein the first port and/or second port is a high-density connection port.

Example 4 is the cable of example 3, wherein the third port is a high-density connection port.

Example 5 is the cable of any one of examples 1-4, further comprising a processor configured to control the multiplexer.

Example 6 is the cable of any one of examples 1-5, further comprising an input configured to receive a control signal to operate the multiplexer.

Example 7 is the cable of any one of examples 1-6, further comprising a transceiver.

Example 8 is the cable of any one of examples 1-7, wherein the first signal lane and the second signal lane are within a single device under test.

Example 9 is the cable of any one of examples 1-7, wherein the first signal lane and the second signal lane are in different devices under test.

Example 10 is the cable of any one of examples 1-9, wherein the cable is a radio frequency cable.

Example 11 is a test and measurement system, comprising a first port structured to electrically connect to a first signal lane; a second port structured to electrically connect to a second signal lane; a third port structured to electrically connect to a test and measurement instrument; a multiplexer configured to switch between electrically connecting the first port to the third port and connected the second port to the third port; an input configured to receive instructions to operate the multiplexer; and a memory structured to store the calibration parameters of the calibrated cable.

Example 12 is a method for connecting one or more signal lanes to a test and measurement instrument, comprising connecting a first signal lane from a first port to a test and measurement instrument through a multiplexer within a test fixture; transmitting a first signal between the first signal lane and the test and measurement instrument through the multiplexer; switching the connection from the first signal lane to a second signal lane from a second port to the test and measurement instrument through the multiplexer; and transmitting a second signal between the second signal lane and the test and measurement instrument through the multiplexer.

Example 13 is the method of example 12, further comprising storing calibration parameters of the test and measurement cable.

Example 14 is the method of example 13, further comprising removing an effect of the test fixture from the first signal and the second signal based on the calibration parameters.

Example 15 is the method of any one of examples 12-14, wherein connecting the first signal lane from the first port to a test and measurement instrument through a multiplexer includes connecting multiple signal lanes from a first device under test within a test fixture to multiple signal lanes of a device under test through the multiplexer.

Example 16 is the method of example 15, wherein the third port is a high-density connection port.

Example 17 is the method of any one of examples 12-16, further comprising receiving a signal from a processor in the test fixture to instruct the multiplexer switch between the first port and the second port.

Example 18 is the method of any one of examples 12-17, further comprising receiving a control signal to operate the multiplexer from the test and measurement instrument.

Example 19 is the method of example 18, further comprising receiving the control signal from a transceiver in the test fixture.

Example 20 is the method of any one of examples 12-19, wherein the first signal lane and the second signal lane are within a single device under test.

Example 21 is the method of any one of examples 12-19, wherein the first signal lane and the second signal lane are in different devices under test.

Example 22 is the method of any one of examples 12-21, wherein the test fixture is a radio frequency cable.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that all features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

We claim:

1. A cable for connecting one or more devices under test to a test and measurement instrument, comprising:
    a first port structured to electrically connect to a first signal lane of the one or more devices under test;
    a second port structured to electrically connect to a second signal lane of the one or more devices under test;
    a third port structured to electrically connect to a test and measurement instrument;

a multiplexer configured to switch between electrically connecting the first port to the third port to provide a first signal path between the one or more devices under test and the test and measurement instrument, and electrically connecting the second port to the third port to provide a second signal path between the one or more devices under test and the test and measurement instrument;

a processor, within the cable, configured to control the multiplexer; and a memory structured to store one or more calibration parameters of the cable, wherein the one or more calibration parameters include at least one de-embed parameter, and wherein the one or more calibration parameters characterize the entire first signal path and the entire second signal path.

2. The cable of claim 1, wherein the first port and/or second port is a high-density connection port.

3. The cable of claim 2, wherein the third port is a high-density connection port.

4. The cable of claim 1, further comprising an input configured to receive a control signal to operate the multiplexer.

5. The cable of claim 1, further comprising a transceiver.

6. The cable of claim 1, wherein the first signal lane and the second signal lane are within a single device under test.

7. The cable of claim 1, wherein the first signal lane and the second signal lane are in different devices under test.

8. The cable of claim 1, wherein the cable is a radio frequency cable.

9. A test and measurement system, comprising:
a first port structured to electrically connect to a first signal lane of a device under test;
a second port structured to electrically connect to a second signal lane of the device under test;
a third port structured to electrically connect to a test and measurement instrument;
a multiplexer configured to switch between electrically connecting the first port to the third port to provide a first signal path between the device under test and the test and measurement instrument and electrically connecting the second port to the third port to provide a second signal path between the device under test and the test and measurement instrument;
an input configured to receive instructions to operate the multiplexer; and
a memory structured to store one or more calibration parameters of the test and measurement system, wherein the one or more calibration parameters include at least one de-embed parameter, and wherein the one or more calibration parameters characterize the entire first signal path and the entire second signal path.

10. A method for connecting one or more signal lanes to a test and measurement instrument, comprising:
connecting a first signal lane from a first port to the test and measurement instrument through a multiplexer within a test fixture;
transmitting a first signal in a first signal path between the first signal lane and the test and measurement instrument through the multiplexer;
switching the connection from the first signal lane to a second signal lane from a second port to the test and measurement instrument through the multiplexer;
transmitting a second signal in a second signal path between the second signal lane and the test and measurement instrument through the multiplexer;
retrieving one or more calibration parameters for the test fixture from a memory, wherein the one or more calibration parameters characterize the entire first signal path and the entire second signal path; and
removing an effect of the test fixture from the first signal and the second signal using the one or more calibration parameters for the test fixture.

11. The method of claim 10, further comprising storing the one or more calibration parameters of the test fixture in the memory, wherein the one or more calibration parameters include at least one de-embed parameter.

12. The method of claim 11, wherein storing the one or more calibration parameters of the test fixture in the memory comprises storing the one or more calibration parameters in a memory within the test fixture, and wherein removing an effect of the test fixture from the first signal and the second signal using one or more calibration parameters for the test fixture comprises sending the one or more calibration parameters from the memory within the test fixture to the test and measurement instrument.

13. The method of claim 11, wherein storing the one or more calibration parameters of the test fixture in the memory comprises storing the one or more calibration parameters and an identification number of the test fixture in a memory within the test and measurement instrument, and wherein retrieving the one or more calibration parameters for the test fixture from the memory comprises retrieving the one or more calibration parameters from the memory within the test and measurement instrument using the identification number.

14. The method of claim 10, wherein connecting the first signal lane from the first port to a test and measurement instrument through a multiplexer includes connecting multiple signal lanes from a first device under test within the test fixture to multiple respective channels of the test and measurement instrument through the multiplexer.

15. The method of claim 14, wherein the third port is a high-density connection port.

16. The method of claim 10, further comprising receiving a signal from a processor in the test fixture to instruct the multiplexer switch between the first port and the second port.

17. The method of claim 10, further comprising receiving a control signal to operate the multiplexer from the test and measurement instrument.

18. The method of claim 17, further comprising receiving the control signal from a transceiver in the test fixture.

19. The method of claim 10, wherein the first signal lane and the second signal lane are within a single device under test.

20. The method of claim 10, wherein the first signal lane and the second signal lane are in different devices under test.

21. The method of claim 10, wherein the test fixture is a radio frequency cable.

* * * * *